(12) United States Patent
Li et al.

(10) Patent No.: US 9,097,931 B2
(45) Date of Patent: Aug. 4, 2015

(54) COLOR FILTER SUBSTRATE AND LIQUID CRYSTAL DISPLAY

(75) Inventors: Kun Li, Beijing (CN); Minghua Xuan, Beijing (CN); Youngyik Ko, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 56 days.

(21) Appl. No.: 13/427,099

(22) Filed: Mar. 22, 2012

(65) Prior Publication Data

US 2012/0242939 A1 Sep. 27, 2012

(30) Foreign Application Priority Data

Mar. 22, 2011 (CN) .................... 2011 2 0077685 U

(51) Int. Cl.
*G02F 1/1335* (2006.01)
*G02F 1/1339* (2006.01)

(52) U.S. Cl.
CPC ...... *G02F 1/133514* (2013.01); *G02F 1/13394* (2013.01); *G02F 2001/13398* (2013.01)

(58) Field of Classification Search
CPC .......... G02F 1/133514; G02F 1/13394; G02F 2001/13398; G02F 1/133512; G02F 2001/13396

USPC ................ 349/106–109, 155–157, 110, 111; 359/891

See application file for complete search history.

(56) References Cited

U.S. PATENT DOCUMENTS

| | | | | |
|---|---|---|---|---|
| 5,500,751 A | * | 3/1996 | Takao et al. | 349/106 |
| 5,917,572 A | * | 6/1999 | Kurauchi et al. | 349/156 |
| 7,586,863 B2 | * | 9/2009 | Tu et al. | 370/311 |
| 7,830,477 B2 | * | 11/2010 | Kim | 349/108 |
| 8,089,603 B2 | * | 1/2012 | Chu et al. | 349/155 |
| 8,451,406 B2 | * | 5/2013 | Kim et al. | 349/106 |
| 2005/0151909 A1 | * | 7/2005 | Yagi et al. | 349/138 |
| 2007/0103629 A1 | * | 5/2007 | Li | 349/123 |
| 2008/0036941 A1 | * | 2/2008 | Zheng et al. | 349/65 |
| 2009/0161046 A1 | * | 6/2009 | Tokuda et al. | 349/106 |
| 2009/0262285 A1 | * | 10/2009 | Jang et al. | 349/106 |
| 2011/0187669 A1 | * | 8/2011 | Abiru et al. | 345/173 |

FOREIGN PATENT DOCUMENTS

WO      WO 2010055596 A1 *  5/2010

* cited by examiner

*Primary Examiner* — Michael Caley
*Assistant Examiner* — Jia Pan
(74) *Attorney, Agent, or Firm* — Ladas & Parry LLP

(57) ABSTRACT

The disclosed technology discloses a color filter substrate comprising a base substrate, a black matrix, a color filter layer and a common electrode layer; wherein the color filter layer has post projection(s) formed therewith. The post projections function as post spacers to support and maintain the cell gap of a liquid crystal cell between the array substrate and color filter substrate.

3 Claims, 6 Drawing Sheets

COLOR FILTER SUBSTRATE AND LIQUID CRYSTAL DISPLAY

BACKGROUND

Embodiments of the disclosed technology relate to a color filter substrate and a liquid crystal display.

Thin film transistor liquid crystal displays (TFT-LCD) have become a dominant kind of flat plate displays in the market due to the advantages of low power consumption, good portability, various applications, high quality, and so on.

At present, a thin film transistor liquid crystal display is formed by injecting liquid crystal material between an array substrate and a color filter substrate after assembling the array substrate and the color filter substrate together. The orientation of the liquid crystal material is controlled by applying voltages on the electrodes on the array substrate and the color filter substrate to form an electric field. The optical characteristics of liquid crystal molecules, such as optical anisotropy, birefringence effect, etc., are utilized to control the luminous flux through the liquid crystal material, thus desired patterns can be displayed on the display panel. Since the cell gap of a liquid crystal cell formed by assembling an array substrate and a color filter substrate together affects the luminous flux through the liquid crystal cell directly, maintaining the cell gap of the liquid crystal cell plays a significant role in improving display uniformity of liquid crystal displays, optimizing display performance, etc.

In order to maintain the uniformity of the cell gap of a liquid crystal cell throughout a liquid crystal display, spacers with certain thickness are conventionally provided between the array substrate and the color filter substrate of the liquid crystal display. Spacers can have two types. One process is to spread ball spacers (BSs) of an uniform size on the array substrate or the color filter substrate by spraying during an assemble process, and the ball spacers of an uniform size are used to maintain the uniformity of the cell gap of the formed liquid crystal cell.

The advantages of this method lie in that ball spacers have good elasticity, are of a low price, and can be applied in a simple process. However, during the spraying process, the number and positions of ball spacers are difficult to control, and ball spacers are easy to aggregate, which may decrease contrast ratio of liquid crystal displays. Thus this method is mainly applied to LCDs for which high display performance are not required.

The other one is to form post spacers (PSs) on the color filter substrate which has been prepared with a black matrix, a color filter layer, and a common electrode layer; PSs are formed as projections in columns on the color filter substrate with a photolithography process by using a mask, and are used to maintain the cell gap of the later formed liquid crystal cell. Because the position, height, appearance of post spacers can be precisely controlled in the photolithography process, the liquid crystal displays using post spacers have significant advance in display performance as compared with the liquid crystal displays using ball spacers.

Presently, in the preparation process of the color filter substrates of TFT-LCDs with post spacers to support and maintain the liquid crystal cell gap, typically a photoresist lithography process is used according to the production design requirements to conduct a photolithography process on a black matrix layer, a color filter layer, and a post spacer layer to obtain the required layer structure. That is, the different kinds of photoresist, which include pigments, small molecule acrylic monomers with multiple functional groups (or other oligomers), ultraviolet light aggregation initiator, organic solvent, pigment dispersing agent and additives for improving coating performance, are used as the materials for forming the black matrix layer, the color filter layer, and the post spacer layer, In order to enhance the color purity in pixels, a black matrix (BM) for shielding light is typically formed with photoresist filled with carbon. Further, in order to prevent light leakage, the black matrix is generally formed below the boundary between the color filter units of different colors; the color filter units (color pixels) typically are formed with photoresist respectively filled with red (R) pigment, green (G) pigment or blue (B) pigment. Post spacers are generally formed with photoresist of good developing property, high mechanical hardness and strong adhesiveness. In general, the various kinds of photoresist used for forming a color filter substrate are negative types of photoresist. As shown in FIG. 1, in preparing a color filter substrate, firstly a black matrix photoresist layer 5 is deposited on a glass substrate 1 as a base substrate, dried and exposed with ultra violet (UV) light by using a mask, and then subject to a development with a developing solution to remove the unexposed portion after drying and exposure; a black matrix photoresist pattern opposite to the mask pattern is left on the substrate. Subsequently, a red pixel photoresist layer 6, a green pixel photoresist layer 7 and a blue pixel photoresist layer 8 are respectively formed on the glass substrate 1 formed with the black matrix photoresist pattern, and similarly, each kind of photoresist of different color is respectively dried, exposed with a mask, and developed with a developing solution to remove the unexposed portion to obtain color pixels; the color pixel photoresist patterns opposite to the mask patterns for the color pixels of different colors. A common electrode layer 9 is formed on the glass substrate 1 described; then a post spacer layer 10 is formed, dried, exposed with a mask and then developed with a developing solution to remove unexposed portion, and post projections used as post spacers for supporting and maintain the liquid crystal cell gap are formed. Finally, a liquid crystal molecule alignment layer 11 is applied the surface on the glass substrate 1 as described above and treated, and the preparation of the color filter substrate is completed here. The formed structure of color filter substrate is shown in FIG. 1.

In the color filter substrate formed in the above method, since the bonding force between the post spacers 10 and the underlying common electrode layer 9 is weak, it is easily for the post spacers 10 to undergo parallel offset under external pressure, resulting in the change of the cell gap of the formed liquid crystal cell, such that the adverse phenomena of display nonuniformity of the liquid crystal display, light leakage and touch mura (brightness nonuniformity due to the nonuniformity of the liquid crystal cell gap under an external force) are invoked, which affects the display performance and compression resistance performance of the liquid crystal display.

SUMMARY

A color filter substrate is provided in an embodiment of the disclosed technology, which is capable of enhancing the bonding force between post spacers and an underlying layer so as to improve display performance and compression resistance property of a thin film transistor liquid crystal display.

One embodiment of the disclosed technology provides a color filter substrate comprising: a base substrate; a black matrix formed on the base substrate, which defines an array formed by a plurality of pixels; and a color filter layer formed on the base substrate and comprising color filter units each in a corresponding pixel; wherein the color filter layer is formed with post projections to be used as post spacers.

Another embodiment of the disclosed technology provides a liquid crystal display comprising a color filter substrate; an array substrate, which is assembled with the color filter substrate to form a liquid crystal panel; and a backlight module provided on a side of the liquid crystal panel. The color filter substrate comprises: a base substrate; a black matrix formed on the base substrate, which defines an array formed by a plurality of pixels; and a color filter layer formed on the base substrate and comprising color filter units each in a corresponding pixel; wherein the color filter layer is formed with post projections to be used as post spacers.

The embodiments of the disclosed technology employ post projections formed in the color filter layer as post spacers to support and maintain the cell gap of a liquid crystal cell formed by assembling together an array substrate and a color filter substrate to oppose each other. Since the bonding between the color pixel photoresist and the base substrate and the black matrix photoresist below the color pixel photoresist is a kind non-metal material to non-metal material bonding, and the bonding force is stronger than that between the post spacer and a common electrode, which is a bonding force between a non-metal material and a metal material. Therefore the adverse phenomena of touch mura, light leakage, and easy parallel offset of post spacers under external pressure due to the weak bonding force between the post spacers and the underlying common electrode layer in the conventional technology can be avoided, and therefore the display performance and compression resistance performance of a TFT-LCD can be improved. Moreover, the preparation of the embodiment of the disclosed technology omits the separate photolithography process for preparing post spacers, that is, omitting the mask required for preparing post spacers separately and reducing the production cycle and cost.

Further scope of applicability of the present disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will be more fully understood from the detailed description given hereinafter and the accompanying drawings which are given by way of illustration only, and thus are not limitative to the disclosed technology and wherein:

FIG. 12-1 is a structure schematic view of the color filter substrate with post projections respectively located above the black matrix on the two sides of an individual pixel in the embodiment;

FIG. 12-2 is a structure schematic view of the color filter substrate with post projections located above a black matrix on one side of an individual pixel unit in the embodiment;

FIG. 14-1 is a structure schematic view of the color filter substrate with post projections having different heights in different color filter units in the embodiment;

FIG. 14-2 is a structure schematic view of the color filter substrate with post projections having different heights in a same color filter unit in the embodiment.

DETAILED DESCRIPTION

The bonding force between two layers of different materials generally depends on the area of bonding and the properties of the materials. In general, the larger the bonding area is, the stronger the bonding force is. The bonding between two kinds of non-metal materials is generally easier than that between a non-metal material and a metal material, and accordingly the bonding force between the non-metal materials is stronger than that between the non-metal material and the metal material. Therefore, increasing the bonding area and improving the properties of material between bonding surfaces are effective approaches for enhancing the bonding force between materials.

Figure 2:
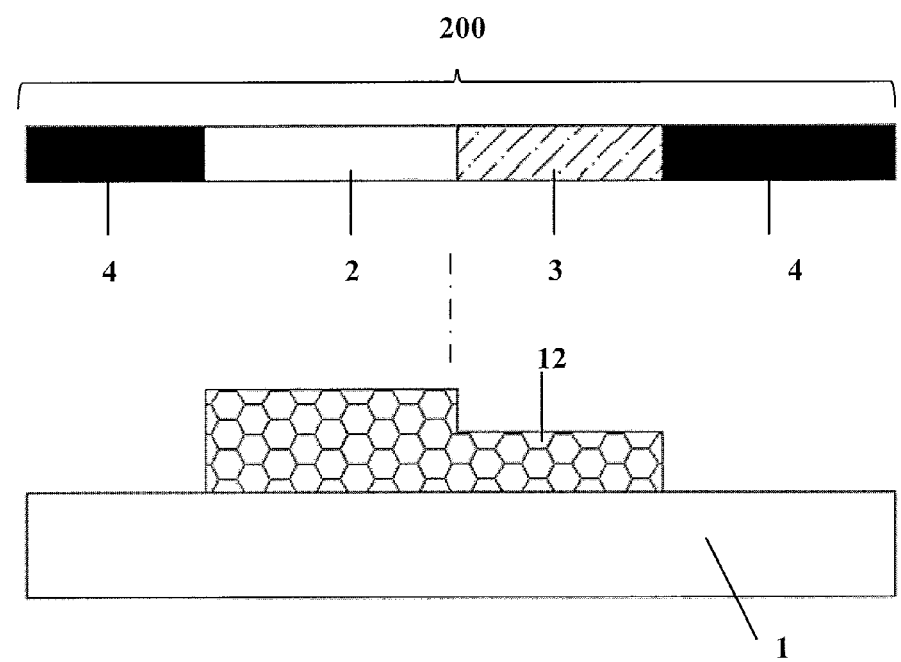
FIG. 2 is a structure schematic view of a negative photoresist layer after exposed with a half tone mask or gray tone mask and developed.

As shown in FIG. 2, a half tone mask (HTM) or a gray tone mask (GTM) 200 has three regions of different modes: a completely transparent region 2, a partially transparent region 3 and an opaque region 4, and thus makes the photoresist on glass substrate 1 exposed with the mask divided into three conditions: completely exposed, partially exposed, and unexposed. Taking a negative photoresist 12 as an example, after being developed, the completed exposed photoresist is not dissolved by a developing solution, the partially exposed photoresist is partially dissolved by the developing solution, and the unexposed photoresist is completely dissolved by the developing solution, so as to obtain two regions with different thickness of photoresist, as shown in FIG. 2. Further, the half tone mask (HTM) or the gray tone mask (GTM) may have more than one partially transparent regions with different levels of transparency, and correspondingly, after development, more than one photoresist regions of partial thickness is formed.

In an embodiment of the disclosed technology, when preparing a color filter layer by using a photolithography process, post (column) projections are formed in a color pixel photoresist layer by using a half tone mask or a gray tone mask, and these post projections work as post spacers to support the cell gap of a liquid crystal cell between an array substrate and a color filter substrate and maintain the cell gap of the liquid crystal cell when the liquid crystal panel is subject to an external force.

In the embodiment of the disclosed technology, because the bonding area between the color pixel photoresist layer and both the underlying glass substrate for forming the color filter substrate and black matrix photoresist is much larger than that between the post spacers and the common electrode on which the post spacers are formed separately in the conventional configuration, and also because the bonding between the color pixel photoresist layer and both the glass substrate and the black matrix photoresist is a kind of a non-metal material to non-metal material bonding, the bonding force is stronger than that between the post spacers and the common electrode on which the post spacers are formed in the conventional configuration, which is a kind of bonding force of a non-metal material to metal material; therefore, the embodiment of the disclosed technology can avoid the defect of easy parallel offset under an external pressure due to the weakness of the bonding force between the post spacers and the underlying common electrode layer.

The color filter substrate of the embodiment of the disclosed technology comprises a glass substrate as a base substrate, a black matrix, a color filter layer, a common electrode layer, and a liquid crystal molecule alignment layer. In the color filter substrate of the disclosed technology, the color filter layer has post projections formed therein, which are used as post spacers, The technical solution of the disclosed technology will be described in more detailed in following in the exemplary embodiment.

Figure 3:
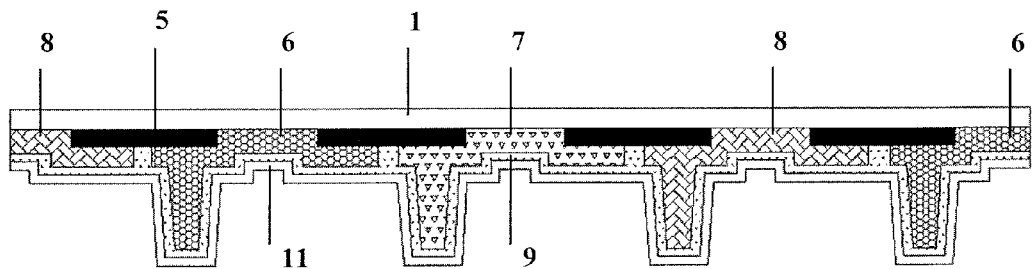
FIG. 3 is a structure schematic view of a color filter substrate of a TFT-LCD in an embodiment of the disclosed technology.

As shown in FIG. 3, a color filter substrate provided by one embodiment of the disclosed technology comprises a glass substrate 1, a black matrix 5, a color filter layer, a common electrode layer 9, and a liquid crystal molecule alignment layer 11. The black matrix defines an array formed by a plurality of pixels, which respectively correspond to the color filter units 6, 7, and 8 of the color filter layer. That is, each of the color filter units is in a corresponding pixel of the array.

The black matrix 5 is formed on the glass substrate 1. The color filter layer, for example, comprises red pixel units 6, green pixel units 7 and blue pixel units 8, each of which has a post projection formed therein and is formed on the glass substrate 1 and the black matrix 5. The common electrode layer 9 is formed on the black matrix 5 and the color filter layer, while the liquid crystal molecule alignment layer 11 is formed on the common electrode layer 9. This glass substrate 1 may be replaced by other kind of transparent substrate such as a plastic substrate or a silica substrate. The color filter layer is not limited to a construction with three primary colors of RGB (Red: Green: Blue); for example, it may be a construction with four primary colors of CMYK (Cyan: Magenta: Yellow: Black). Although each color pixel unit comprises one post projections as shown in FIG. 3, those skilled should understood that this is not restrictive; in another example, some color pixel unit can have no post projections formed therein if enough support is provided by the formed post projections.

A preparing process of the color filter substrate provided by one embodiment of the disclosed technology comprises the following steps.

Figure 4:
FIG. 4 is a structure schematic view of a glass substrate on which a black matrix photoresist layer is deposited in the embodiment.
Figure 5:
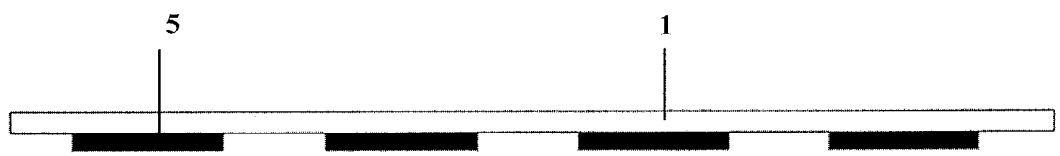
FIG. 5 is a structure schematic view of a black matrix photoresist after exposure and developing in the embodiment.
Figure 6:
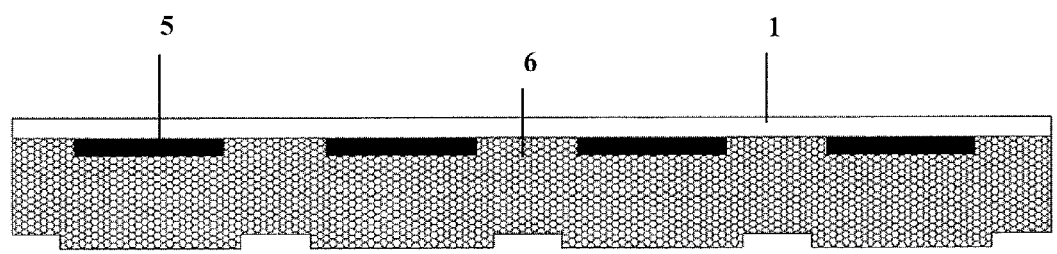
FIG. 6 is a structure schematic view of the color filter substrate after a red (R) pixel photoresist layer is deposited in the embodiment.
Figure 7:
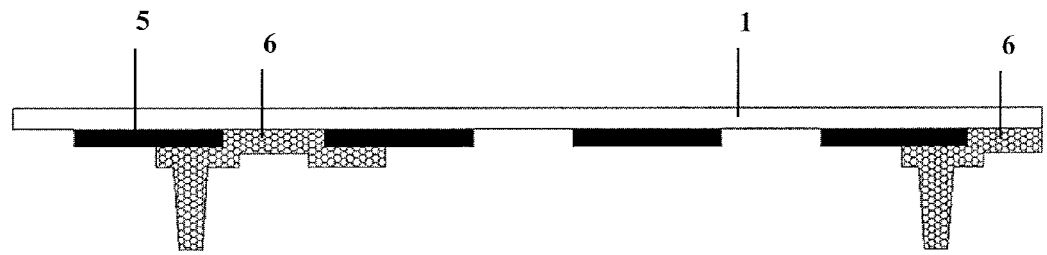
FIG. 7 is a structure schematic view of the color filter substrate after the red (R) pixel photoresist layer is exposed with ultraviolet light by using a half tone mask or gray tone mask in the embodiment.

Step 101, depositing a black matrix photoresist layer 5 on a glass substrate 1, as shown in FIG. 4;

Step 102, drying the glass substrate 1 after the step 101, exposing the black matrix photoresist layer 5 with ultraviolet light by using a mask, removing the unexposed portion with a developing solution, and leaving the black matrix photoresist pattern opposite to the mask pattern, such that a black matrix 5 is formed, as shown in FIG. 5;

Step 103, preparing a red (R) pixel photoresist pattern and post spacers on the glass substrate 1 after step 102, wherein this step comprises the following two sub-steps:

Step 1031, depositing a red (R) pixel photoresist layer 6 on the glass substrate 1 and the black matrix 5, as shown in FIG. 6; and Step 1032, drying the glass substrate 1 after step 1031, then exposing the red (R) pixel photoresist layer 6 with ultraviolet light by using a half tone mask or gray tone mask, leaving the red (R) pixel photoresist pattern opposite to the mask pattern after developing, and forming post projections above the black matrix 5 as post spacers, such that a red (R) pixel unit 6 having a post projection is formed;

In order to avoid the adverse light leakage in a display region and decrease of contrast caused by the orientation of the liquid crystal molecules corresponding to the post projections, the post projections of the photoresist layer can be provided above the black matrix 5 and on a side of the red pixel unit 6, as shown in FIG. 7.

Figure 8:
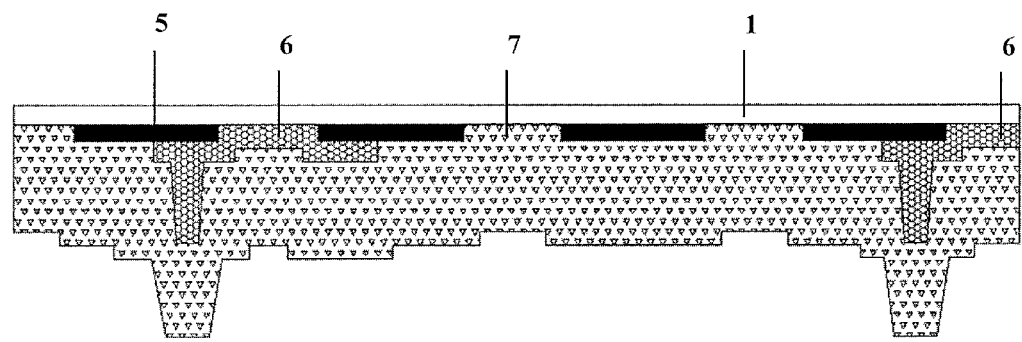
FIG. 8 is structure schematic view of the color filter substrate after a green (G) pixel photoresist layer is deposited in the embodiment.

Step 104, preparing a green (G) pixel photoresist pattern and post spacers on the glass substrate 1 after step 103, wherein this step comprises the following two sub-steps:

Step 1041, depositing a green (G) pixel photoresist layer 7 on the glass substrate 1, the black matrix 5 and the red (R) pixel unit 6, as shown in FIG. 8; and Step 1042, drying the glass substrate 1 after the step 1041, exposing the green (G) pixel photoresist layer 7 with ultraviolet light by using a half tone mask or gray tone mask, leaving the green (G) pixel photoresist pattern opposite to the mask pattern after developing, and forming post projections above the black matrix 5 as post spacers, such that a green (G) pixel unit 7 having a post projection is formed.

Figure 9:
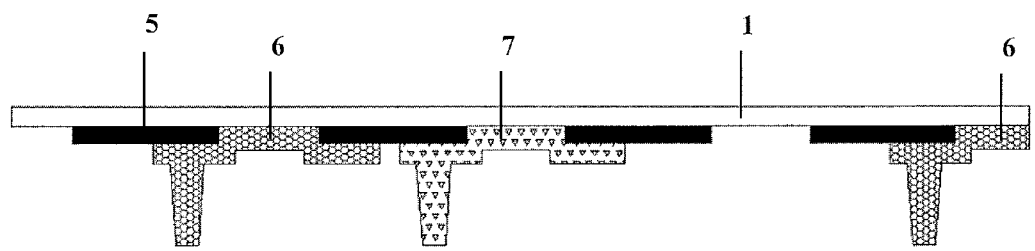
FIG. 9 is a structure schematic view of the color filter substrate after the green (G) pixel photoresist layer is exposed with ultraviolet light by using a half tone mask or gray tone mask in the embodiment.

In order to avoid the adverse light leakage in a display region and decrease of contrast caused by the orientation of the liquid crystal molecules corresponding to the post projections, the post projections of the photoresist layer can be provided above the black matrix 5 and on a side of the green pixel unit 7, as shown in FIG. 9.

Figure 10:
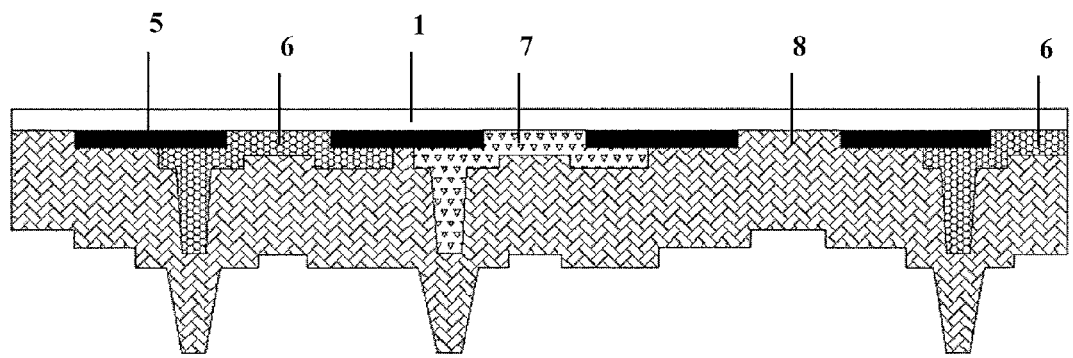
FIG. 10 is a structure schematic view of the color filter substrate after a blue (B) pixel photoresist layer is deposited in the embodiment.

Step 105, preparing a blue (B) pixel photoresist pattern and post spacers on the glass substrate 1 after step 104. This step comprises the following two sub-steps:

Step 1051, depositing a blue (B) pixel photoresist layer 8 on the glass substrate 1, the black matrix 5, red (R) pixel unit 6 and the green (G) pixel unit 7, as shown in FIG. 10; and Step 1052, drying the glass substrate 1 after step 1051, exposing the blue (B) pixel photoresist layer 8 with ultraviolet light by using a half tone mask or gray tone mask, leaving the blue (B) pixel photoresist pattern opposite to the mask pattern after developing, and forming post projections above the black matrix 5 as post spacers, such that a blue (B) pixel unit 8 having post projection is formed.

Figure 11:
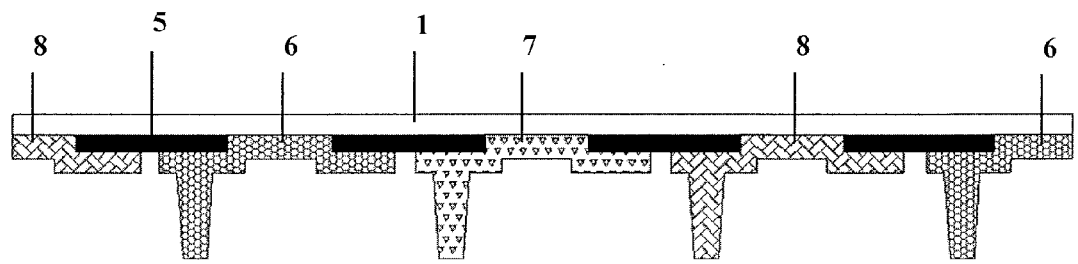
FIG. 11 is a structure schematic view of the color filter substrate after the blue (B) pixel photoresist layer is exposed with ultraviolet light by using a half tone mask or gray tone mask in the embodiment.

In order to avoid the adverse light leakage in a display region and decrease of contrast caused by the orientation of the liquid crystal molecules corresponding to the post projections, the post projections of the photoresist layer can be provided above the black matrix 5 and on a side of the blue pixel unit 8, as shown in FIG. 11.

Step 106, depositing a common electrode layer 9 on the glass substrate 1 after step 105; and Step 107, coating a liquid crystal molecule alignment layer 11 on the glass substrate 1 after step 106, as shown in FIG. 3. This alignment layer can be subject to a rubbing treatment.

Here, the preparation of the color filter substrate according to the disclosed technology is accomplished.

The sequence or order for preparing the color filter units 6-8 may be different in the embodiment of the disclosed technology, i.e., the order of the steps 103, 104, 105 may be modified, for example, firstly step 104, and then step 105, and finally step 103 are conducted.

Figure 1:
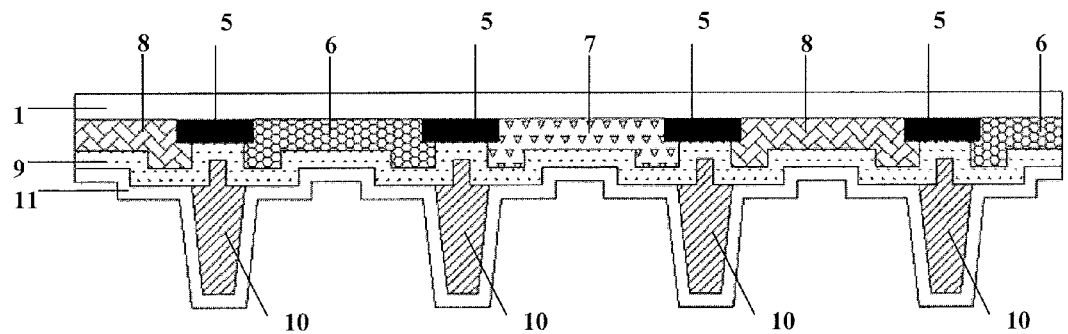
FIG. 1 is a structure schematic view of a color filter substrate of a TFT-LCD using post spacers in prior art.
Figures 1, 12:
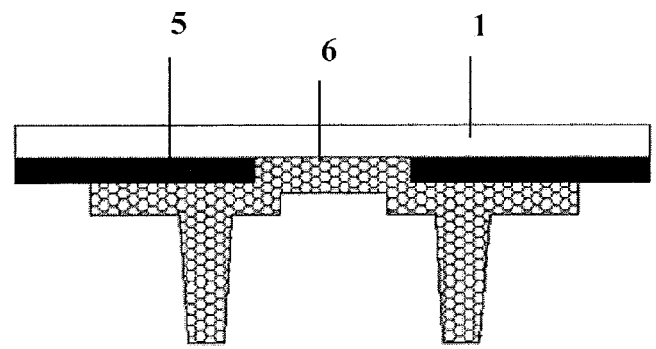
Figures 2, 12:
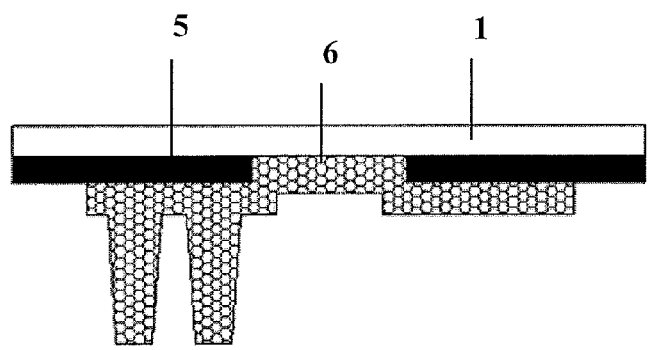

In the embodiment of the disclosed technology, the number of post projections of an individual pixel unit may be a, where a=0, 1, 2 . . . . Moreover, the positions of post projections above the black matrix may be designed as necessary. For example, when a=2, each of post projection may be located above the corresponding black matrix respectively on the either side of an pixel unit, as shown in FIG. 12-1; or, the two post projections may be located above a black matrix on a same side of a pixel unit together, as shown in FIG. 12-2.

Figure 13:
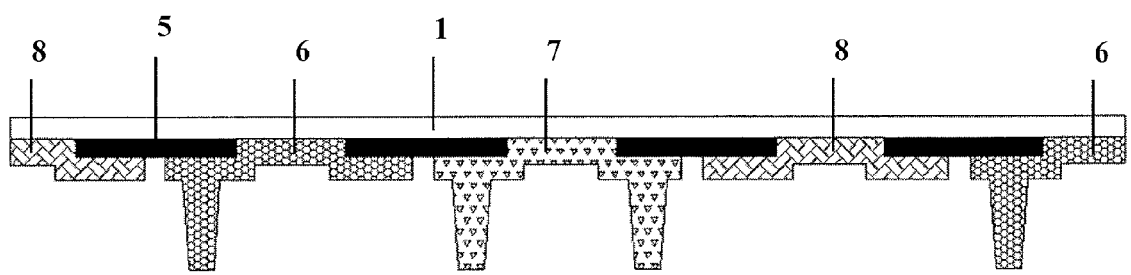
FIG. 13 is a structure schematic view of the color filter substrate with the number of post projections on the red (R) pixel unit being 1, the number of post projection on the green (G) pixel unit being 2, and the number of post projections on the blue (B) pixel unit being 0 in the embodiment.

The post projections as post spacers prepared in the embodiments of the disclosed technology may be in a same or different number among the color filter units. The number of post projections in the red (R) pixel unit is a, the number of post projections in the green (G) pixel unit is b, and the number of post projections in the blue (B) pixel unit is c, wherein a=b=c, or a≠b≠c, or a≠b=c, or a=b≠c, or a=c≠b. For example, the number of post projection on the red (R) pixel unit is 1, the number of post projections on the green (G) pixel unit is 2, and the number of post projections on the blue (B) pixel unit is 0, as shown in FIG. 13.

Figures 1, 14:
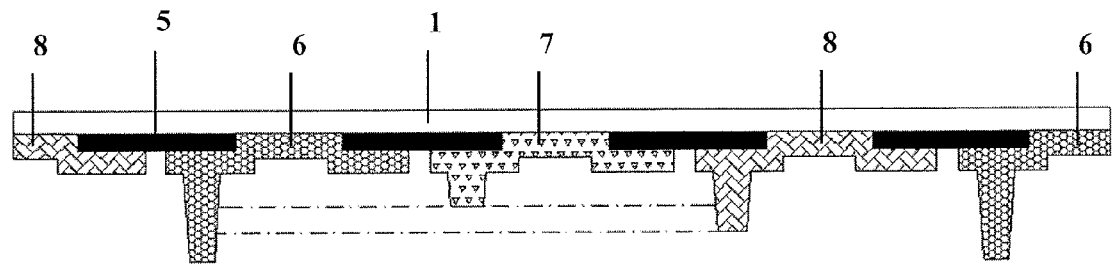
Figures 2, 14:
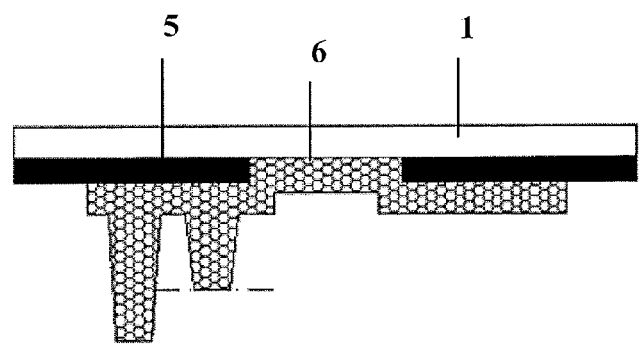

In addition, in the embodiment of the disclosed technology, the post projections of different heights may be prepared by designing the partially transparent regions of a half tone mask or a gray tone mask for exposure. The height of post projections may be same or different in different color filter units; for instance, the height of post projections is h1 in the red (R) pixel units, the height of post projections is h2 in the green (G) pixel units, and the height of post projections is h3 in the blue (B) pixel units, wherein h1=h2=h3, or h1≠h2≠h3 (as shown in FIG. 14-1), or h1≠h2=h3, or h1=h2≠h3, or h1=h3≠h2. Further, the heights of post projections may be same or different in a same color filter unit, as shown in FIG. 14-2, in which case the mask used for exposure comprises at least two partially transparent regions.

In another embodiment of the disclosed technology, except that a common electrode layer 10 is not formed, a color filter substrate has substantially the same structure as that in the above-described embodiment shown in FIG. 3. Such a color filter substrate can be used in a LCD of plane electric field type such as in-plain switching (IPS) mode or fringe-field switch (FFS) mode.

In yet another embodiment of the disclosed technology, except that a liquid crystal molecule alignment layer 11 is not formed, a color filter substrate has substantially the same structure as that in the above-described embodiment shown in FIG. 3.

Figure 15:
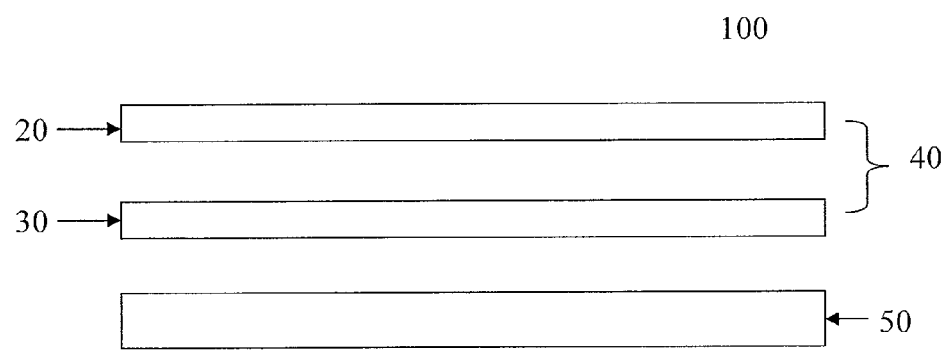
FIG. 15 is a schematic view of the liquid crystal display according to another embodiment of the disclosed technology.

In another embodiment of the disclosed technology shown in FIG. 15, a liquid crystal display (LCD) 100 is disclosed, and the LCD 100 comprises a color filter substrate 20, which is any of the embodiments described above, and an array substrate 30. The substrates 20 and 30 are assembled together to form a liquid crystal panel 40, which comprises a liquid crystal cell. A liquid crystal layer is filled within the space between the color filter substrate 20 and array substrate 30, and the liquid crystal cell is obtained by sealing the space with sealant. A backlight module 50 is provided under the liquid crystal panel 40 to provide a light source for the liquid crystal panel 40. The LCD may be of a vertical electric field type, a horizontal electric field type, and so on. After the color filter substrate 20 and the array substrate 30 are assembled together with sealant to form the liquid crystal cell, the tops of the post projections formed on the color filter layer contact the top surface of the array substrate so as to work as post spacers for controlling the cell gap of the liquid crystal panel.

A method of preparing a color filter substrate is disclosed in another embodiment of the disclosed technology. In the method, when a photoresist layer is used to form any of the color filter units of a color filter layer, exposure is conducted by using a double tone mask (a gray tone mask or a half tone mask), and post projections are formed on the color filter layer after development and to be used as post spacers. This color filter layer is not limited to RGB type color filter layer, and may be combinations of other type color layer such as a CMYK type color filter layer.

The embodiment of the disclosed technology being thus described, it will be obvious that the same may be varied in many ways. Such variations are not to be regarded as a departure from the spirit and scope of the disclosed technology, and all such modifications as would be obvious to those skilled in the art are intended to be included within the scope of the following claims.

What is claimed is:

1. A color filter substrate comprising:
   a base substrate;
   a black matrix formed on the base substrate, which defines an array formed by a plurality of pixels; and
   a color filter layer formed on the base substrate and comprising color filter units each in a corresponding pixel;
   a common electrode layer formed on the color filter layer; and
   a liquid crystal molecule alignment layer formed on the common electrode layer;
   wherein the color filter layer is formed integrally with at least two post projections to be used as post spacers and formed on the base substrate and the black matrix, and the post projections to be used as post spacers are formed on the black matrix;
   wherein the at least two post projections to be used as the post spacers are formed only by and integrally with the color filter layer in the corresponding single color filter unit on the black matrix, and are different in height.

2. The color filter substrate according to claim 1, further comprising the liquid crystal molecule alignment layer formed on the color filter layer.

3. A liquid crystal display comprising:
   a color filter substrate;
   an array substrate, which is assembled with the color filter substrate to form a liquid crystal panel; and
   a backlight module provided on a side of the liquid crystal panel;
   wherein the color filter substrate comprises:
   a base substrate;
   a black matrix formed on the base substrate; which defines an array formed by a plurality of pixels; and
   a color filter layer formed on the base substrate and comprising color filter units each in a corresponding pixel;

a common electrode layer formed on the color filter layer; and a liquid crystal molecule alignment layer formed on the common electrode layer;

wherein the color filter layer is formed integrally with at least two post projections to be used as post spacers and formed on the base substrate and the black matrix, and the post projections to be used as post spacers are formed on the black matrix;

wherein the at least two post projections to be used as the post spacers are formed only by and integrally with the color filter layer in the corresponding single color filter unit on the black matrix, and are different in height.

* * * * *